United States Patent [19]

Weman

[11] 4,185,792
[45] Jan. 29, 1980

[54] LOCKING DEVICE FOR A SAFETY BELT RETRACTOR

[75] Inventor: Per O. Weman, Heverlee, Belgium

[73] Assignee: N.V. Klippan S.A., Haasrode, Belgium

[21] Appl. No.: 845,710

[22] Filed: Oct. 26, 1977

[30] Foreign Application Priority Data

Oct. 28, 1976 [DE] Fed. Rep. of Germany ....... 2648902

[51] Int. Cl.² .................. A62B 35/02; B65H 75/48
[52] U.S. Cl. .............................................. 242/107.4 B
[58] Field of Search ............... 242/107.4 R, 107.4 E; 280/744–747; 297/388

[56] References Cited

U.S. PATENT DOCUMENTS

| | | | |
|---|---|---|---|
| 2,899,146 | 8/1959 | Barecki | 242/107.4 B |
| 2,992,790 | 7/1961 | Cushman et al. | 242/107.4 B |
| 3,100,609 | 8/1963 | Wrighton | 242/107.4 B |
| 3,917,189 | 11/1975 | Bryll | 242/107.4 B |
| 3,979,083 | 9/1976 | Fohl | 242/107.4 B |

*Primary Examiner*—John M. Jillions
*Attorney, Agent, or Firm*—Patrick L. Henry

[57] ABSTRACT

This invention relates to a locking device for a safety belt retractor comprising a reel shaft and a ratchet wheel provided with locking teeth and engageable with pawls, characterized by the fact that a synchronization disk (5) bearing actuating parts (16) engageable with a pawl (13) and provided with at least a first disengagement device (9), and an axially undisplaceable ratchet wheel (4) with at least a complementary second disengagement device (8) are disposed on said reel shaft (1), that when the synchronization disk (5) and the ratchet wheel (4) rotate relative to each other, at least a part of the synchronization disk (5) is deformed or displaced to actuate locking by the pawl (13) and that actuation chronologically precedes locking.

8 Claims, 14 Drawing Figures

LOCKING DEVICE FOR A SAFETY BELT RETRACTOR

BACKGROUND OF THE INVENTION

1. Field of the Invention

The invention relates to a locking device for a safety belt retractor comprising a reel shaft and a ratchet wheel that can be brought into engagement with pawls.

2. Description of the Prior Art

Many such retractors are known wherein a rotary motion is converted into an axial motion. For example, U.S. Pat. No. 3,970,265 describes one such retractor wherein a ratchet wheel, which is rigidly connected to the wheel shaft cannot be engaged directly with pawls secured to the housing but wherein an inertial wheel, rotatably disposed on the reel shaft and axially displaceable, is engageable with pawls by means of teeth disposed on the side of the inertial wheel opposite to the pawls. The ratchet wheel is provided with ratchet-type teeth or engagement bevels, and the inertial wheel which normally engages the ratchet wheel is provided with corresponding bevel-shaped recesses. The beveled surfaces of the ratchet wheel and of the inertial wheel which face each other permit a slipping movement to take place when the last-cited wheels rotate relative to each other, resulting in an axial movement of the inertial wheel onto the pawls. This, finally, causes effective engagement between the pawls and the engagement teeth on the inertial wheel which stops the inertial wheel and this, in turn, through the ratchet wheel, blocks the entire reel shaft.

When, in the use of this known belt retractor, during an accident, the belt is suddenly withdrawn at high acceleration, the ratchet wheel will follow this accelerated rotation, but the inertial wheel, because of its large inertial mass, will lag behind resulting in rotation of the ratchet wheel relative to the inertial wheel and the aforedescribed blocking of the reel shaft.

Many motor vehicle manufacturers insist on close locking tolerances, i.e., the belt retractor must be able to block within a narrow and exactly defined acceleration range. The aforedescribed, known belt retractor does not meet such tolerance requirements unless the spring is modified, and particularly not in cases where the shaft is disposed vertically and not approximately horizontally. Moreover, the mutually engaging teeth and pawls frequently are not ideally sharp so that frequently the tips of the teeth and pawls just touch each other and as a result valuable time is lost while the reel shaft continues to turn and the belt is further withdrawn from the retractor, until the slipping tooth tips finally engage the corresponding tooth system and bring about blocking. Moreover, the known belt retractor responds adversly to axial impact in the direction of the axial blocking motion of the inertial wheel. The inertial mass of said inertial wheel, namely, in reacting to the impact tends to move away from the pawls while the engagement bevels ensure that the teeth engage the pawls. This, too, will extend the unsafe time interval between the condition just before the engagement of the corresponding tooth systems and effective and complete engagement.

Another known belt retractor, described in U.S. Pat. No. 3,802,642, has similar drawbacks and also requires adjustment during installation. On axial impact of the motor vehicle, here, too, the inertial wheel is disengaged by the bevels of the ratchet wheel and pressed into the unlocked position in the direction opposite to that of disengagement. As a result, the desired locking cannot occur with the required precision and within narrow locking tolerances. This situation remains unchanged even when a "pocket" having an annular internal surface is used which swings out in the event of sudden deceleration of the motor vehicle and by touching an edge of the inertial wheel also causes said wheel to slow down.

The belt retractor according to U.S. Pat. No. 3,929,300 although not responding to axial impact of the aforedescribed type is not provided with axially displaceable inertial wheels. The cited patent describes two ratchet wheels which on their circumferential surface are provided with teeth. When in an accident the belt is suddenly rapidly withdrawn at high acceleration, these wheels simply move through a rotation angle into engagement with a toothed locking ring, said wheels then absorbing the entire locking force. The wheels can only rotate relative to the reel shaft but are not axially displaceable.

According to an older proposal, finally, a belt retractor is provided with a ratchet wheel, a pawl and a complicated pawl-actuating device with which, both in the event of motor vehicle acceleration and on rapid belt withdrawal, an actuating arm brings the pawl into engagement with the ratchet wheel. The vehicle-sensitive actuating device is equipped with a weak gear and a thin pawl. If, in an accident, while engaging the ratchet wheel, this pawl does not find a tooth space, it is protected from damage by a coupling disk which acts as a slip clutch and prevents the narrow, thin pawl or the weak actuating gear from breaking.

SUMMARY OF THE INVENTION

The object of the invention is to provide an improved belt retractor sensitive only to angular acceleration of the reel shaft but not to axial, lateral accelerations and which, in addition, is characterized by the fact that in the event of actuation or an accident, the teeth of the ratchet wheel are always in proper relationship or position relative to the engaging pawl so that, in an accident, this pawl can always fall into a tooth space.

This object is achieved in that the aforedescribed locking device is provided on the reel shaft with a synchronization disk engageable with a pawl and bearing actuating members, said disk being provided with at least a first disengagement device, and an axially nondisplaceable ratchet wheel provided with at least a complementary second disengaging device, that when the synchronization disk and the ratchet wheel rotate relative to each other at least a part of the synchronization disk is deformed to actuate the locking engagement of the pawl and that the actuation chronologically precedes the locking. Essential features are the axial undisplaceability of the ratchet wheel and the smaller mass of the synchronization disk compared to the ratchet wheel. In fact, unlike the known locking devices, the locking device of the present invention does not respond to lateral impact because it contains no axially displaceable member of large mass. The novel locking device according to the invention responds only when the belt is jerkily withdrawn from the belt retractor at an annular acceleration exceeding a predetermined acceleration limit. In this case, in a preferred embodiment of the invention, the synchronization disk and the ratchet wheel rotate relative to each other while at the circumferential surface, in the center or in other zones of the synchronization disk parts of said disk are deformed, perferably in axial direction, making contact engagement with the pawl possible so that the pawl is first actuated, i.e., it falls into the locking position, and then—chronologically shortly thereafter—locking occurs between the pawl and the teeth of the ratchet wheel. This arrangement definitely ensures that, in a locking situation, the pawl will always be in a favorable position relative to the locking teeth.

DESCRIPTION OF THE PREFERRED EMBODIMENTS

A particularly preferred embodiment of the invention is further characterized by the fact that the deforamble part of the synchronization disk is movable in the axial direction, that the synchronization disk is nonrotatably secured to the reel shaft and that the ratchet wheel disposed on the reel shaft is rotatable only to a limited extent. The construction of this embodiment is very simple in view of the fact that the ratchet wheel acts at the same time as an inertial wheel. In fact, on the reel shaft said wheel can rotate only over a short distance, for example through an angle of 5°-10°, preferably through 5°. This limited rotary mobility and reliable prevention of axial displaceability are technically readily achieved by providing suitable cams on the reel shaft and complementary cam recesses in the ratchet wheel. Although angular movements greater than those indicated hereinabove are possible, the essential feature of the simplification according to the invention is that the ratchet wheel itself acts as an inertial wheel over a limited rotation distance and as a ratchet wheel after the engagement of the pawl. The large mass of the inertial wheel, required for strength, is used here at the same time as inertial mass in amazingly advantageous manner.

In still another embodiment of the aforecited locking device according to the invention, the aforedescribed objective is reached in that the ratchet wheel is secured to the reel shaft, a synchronization disk having a very small mass moment of inertia relative to the inertial wheel is rotatably secured to the reel shaft and is provided with at least one axial disengagement device and, on the circumferential surface thereof, with teeth engageable with a cam [engaging] part fastened to the pivotable pawl, said synchronization disk, when the ratchet wheel rotates relative to the inertial wheel, being movable against a spring force over a complementary second axial disengagement device, and that the teeth of the synchronization disk are angularly [polarly] displaced with respect to the teeth of the ratchet wheel. Advantageously, the inertial wheel is disposed on the reel shaft so as to be only rotatable but definitely not axially movable. Axial impact in an automobile collision, therefore, cannot affect the inertial member in a manner that would interfere with the locking engagement. The synchronization disk with its very low mass moment of inertia does not respond to axial impact normally encountered in collision. Said disk can be fabricated from steel plate, plastic or similar materials. The teeth provided on the circumferential surface of said disk, on contact with the cam need exert only a very small force to actuate the pivotable pawl, after which the synchronization disk has completed its function. The actual locking forces are absorbed by the heavy-duty pawl and ratchet wheel. By means of a suitable arrangement of the cam on the pivotable pawl or by means of a connecting member, to be described in greater detail in the following, it is always possible to hold the teeth of the synchronization disk displaced by a small angle relative to the teeth of the ratchet wheel thereby always enabling the tip of the pawl to fall into a tooth space of the ratchet wheel. In this manner, the unsafe interval just preceding the engagement of the pawl and the ratchet wheel is kept very short, and narrow locking tolerance requirements can be met without complicated constructional measures.

In another preferred embodiment, according to the invention, the first axial disengagement device is advantageously provided with a bevel-shaped recess or depression having contact surfaces concentric with the reel shaft, and the second axial disengagement device is provided with bevels, spheres held in depressions or cylinders. To ensure disengagement, 2 or preferably at least 3 bevels and bevel-shaped recesses are provided, whose function as well as that of the depressions or, for example, spheres held therein, is ensured when the contact surfaces are arranged concentrically with respect to the reel shaft. In place of the bevels or depressions, cylinders or casings loosely inserted into a ring groove may be used ensuring disengagement in case of even the slightest displacement, such as occurs when the ratchet wheel rotates relative to the inertial wheel.

In a further, particularly advantageous embodiment of the invention, the bevels are fixed to the inertial wheel, a spring is placed between the ratchet wheel and the synchronization disk which is positioned between the ratchet wheel and the inertial wheel, and a connecting member, preferably in the form of a pin, is disposed between the ratchet wheel and the synchronization disk for coupling purposes. Said connecting member may either be screwed into or pressure-fit to the ratchet wheel or welded thereon, or else it can consist of a projection. Preferably, it is fabricated in one piece with the ratchet wheel, as will be described hereinbelow. Said connecting member ensures that, under normal circumstances, the synchronization disk, which is axially movable on the shaft, always rotates at the angular velocity of said shaft, the ratchet wheel being fixed to the shaft in the embodiments described in the following. When the belt is suddenly withdrawn at high acceleration, the inertial wheel rotating at a slower angular velocity lags behind the ratchet wheel and the synchronization disk coupled thereto thereby disengaging said disk against the spring force. As a result, the teeth disposed externally on the circumferential surface of the synchronization disk, by means of the cam, urge the pawl into engagement with the ratchet wheel.

Another preferred embodiment of the invention is characterized by the fact that the bevels are fixed to the inertial wheel, that the spring is provided between the synchronization disk and an external disk fastened to the shaft and that between the ratchet wheel and the synchronization disk there is disposed an inertial wheel provided with a longitudinal hole and a connecting member passing through said longitudinal hole and coupling the ratchet wheel and the synchronization wheel. According to the principle of the invention, the sequence in which the ratchet wheel, synchronization disk and inertial wheel are arranged may be altered without sacrificing the cited advantages and surprising effects of the novel belt retractor or additionally complicating its construction. It is important and advantageous that the inertial wheel disposed on the shaft is only rotatable and does not respond to lateral impact in the direction of the shaft axis in spite of its large mass moment of inertia.

A further, fourth advantageous embodiment is characterized by the fact that the bevels are fixed to the ratchet wheel, that a spring is provided between the inertial wheel and the synchronization disk and that a connecting member is disposed between the inertial wheel and the synchronization disk to couple one to the other. It depends on the particular embodiment, construction and materials selection whether the bevels are preferably provided on the ratchet wheel or on the inertial wheel. The principle of the invention, however, is equally effective in all embodiments ensuring a belt retractor sensitive only to angular acceleration and with which close locking tolerances can be achieved.

According to the invention, it is further advantageous to provide the cam [engaging] part fastened to the pivotable pawl with a narrow, thin projection. For example, said part may have an edge or a small angle or a thin or pointed projection, considering that the purpose of this part is only to actuate the locking function for which other parts are responsible; hence, this part can be constructed very sensitively from thin, delicate elements. Moreover, with thin edges, points or projections, the engagement time is much shorter than when strong teeth on the ratchet wheel and a heavy-duty pawl are used which definitely cannot be mass-produced with ideally sharp edges.

According to the invention, it is, furthermore, advantageous if the spring is fabricated in one piece with and from the synchronization disk. Such a spring can be obtained, for example, by punching out a more or less long arch from said disk and pulling said arch out of the plane of the disk. The connecting member, for example, can also be made in this manner, by simply punching it out of the synchronization disk.

Further advantages, features and applications of the present invention will become apparent from the following description and in connection with the accompanying drawings, in which.

Figure 1:
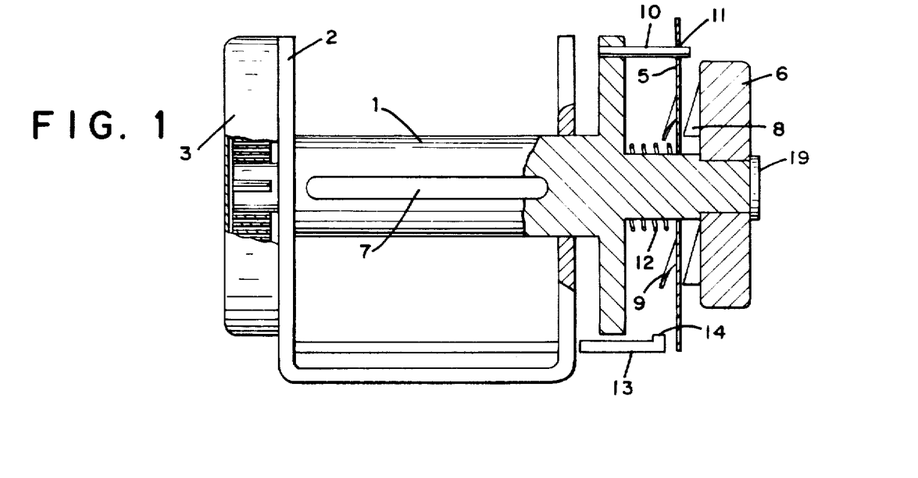
FIG. 1 is a total sectional view of a first embodiment of the belt retractor and locking device according to the invention.

The locking device shown in the right-hand half of the drawing of FIG. 1 comprises reel shaft 1, housing 2 supporting rotatable shaft 1 and a winding spring placed in housing 3. Ratchet wheel 4 is rigidly secured, by welding, splining or a similar method, on reel shaft 1 shown in section in the righthand half of FIG. 1. Disk 19, externally rigidly connected to reel shaft 1 and an internal shoulder form a bearing for inertial wheel 6 which can rotate freely with respect to reel shaft 1 but is restrained in the axial direction by the shoulder. Synchronization disk 5, placed between ratchet wheel 4 and inertial wheel 6, is axially displaceable and has a very small mass moment of inertia relative to inertial wheel 6. Synchronization disk 5 is nonrotatably connected with ratchet wheel 4 by means of pin 10 which is secured to ratchet wheel 4 and passes through a corresponding hole 11 in said synchronization disk 5. In other words, in use, in the first embodiment which is described in FIGS. 1-5, synchronization disk 5, reel shaft 1 and ratchet wheel 4 rotate together. The reason for providing hole 11 in synchronization disk 5 is to enable said disk to move, against the force of spring 12 provided between ratchet wheel 4 and synchronization disk 5, to the left in the views of FIGS. 1 and 4, into the position depicted in FIG. 5. Pin 10 then protrudes slightly through hole 11 in synchronization disk 5.

Figure 2:
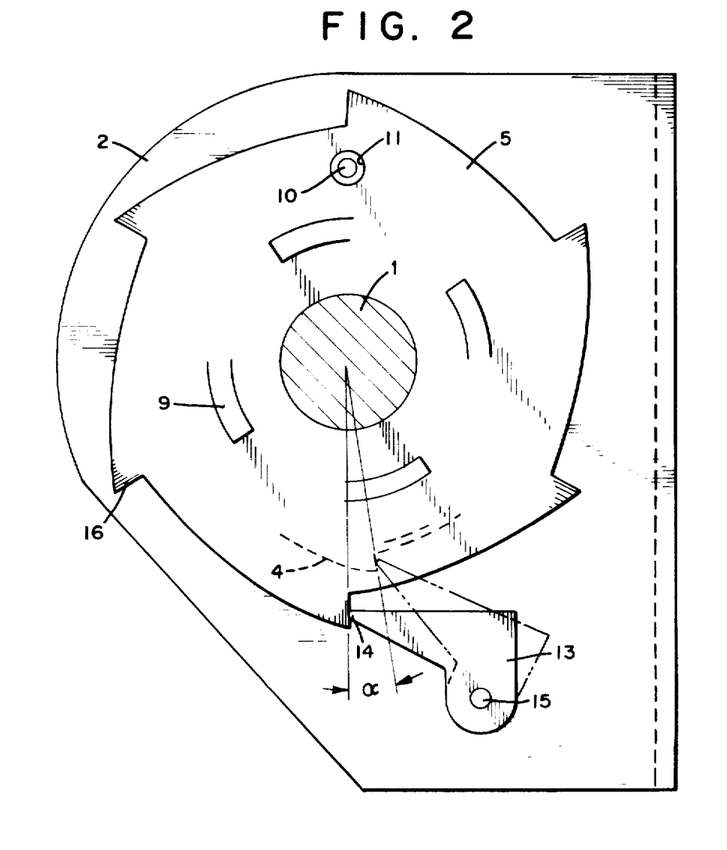
FIG. 2 is a sectional side view of the synchronization disk, the section being perpendicular to the reel shaft and between the synchronization disk and the inertial wheel.

FIG. 2 is an external lateral view of retractor housing 2 depicted on the right-hand side of FIG. 1, in front of which is shown synchronization disk 5 with bevel-shaped recesses 9. Recognizable at the top is round hole 11 accommodating pin 10 which constitutes the connecting member that couples ratchet wheel 4 to synchronization disk 5. Pivotably attached to shaft 15 is pawl 13 in front of or above which, in the representation of FIG. 2, pass teeth 16 of synchronization disk 5. The outline of a part of ratchet wheel 4 is indicated by broken lines, the external diameter of said ratchet wheel being smaller than that of synchronization disk 5. Moreover, pin 10 ensures that the teeth of synchronization disk 5 and those of ratchet wheel 4 are displaced by an angle α.

Figure 3:
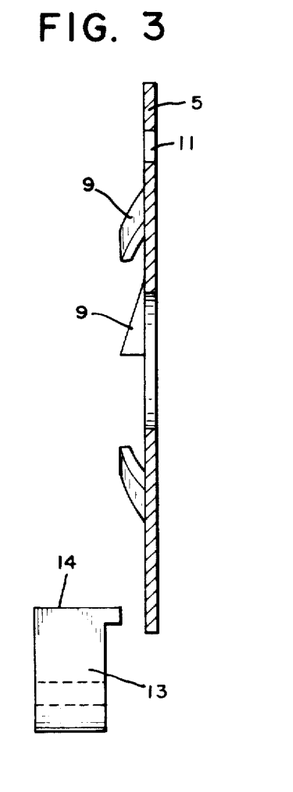
FIG. 3 is a schematic view in the direction of the plane of the synchronization disk, with only said disk and the pawl being shown.

FIG. 3 is a view of synchronization disk 5 seen from the narrow side; it shows bevel-shaped recesses 9 obtained by punching out and bending upward the parts indicated in FIG. 2. Pawl 13 which is provided with narrow, thin cam [engaging] edge 14, under normal conditions is positioned next to synchronization disk 5 whose teeth 16 engage cam edge 14 only after disk 5 is axially displaced against the force of spring 12 as shown in FIG. 5.

Figure 4:
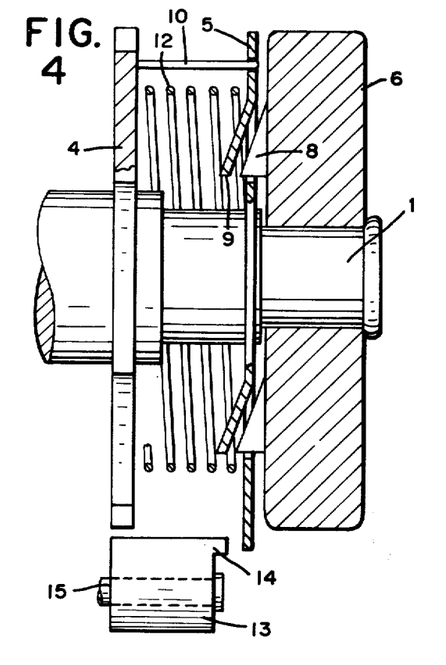
FIG. 4 is a sectional view similar to FIG. 1 but without the housing and the retractor parts shown in FIG. 1 further to the left, in the normal position.
Figure 5:
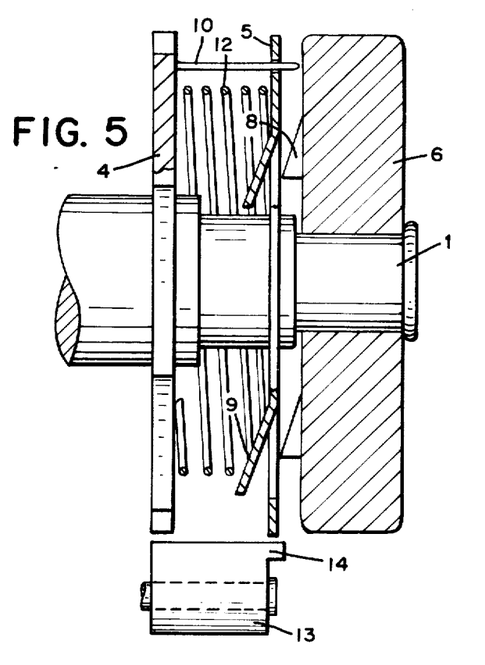
FIG. 5 is the same view as FIG. 4, but in the locking position, after the synchronization disk has been disengaged.

The function of the first embodiment of the locking device according to the invention is most effectively explained with references to FIGS. 4 and 5. Under normal conditions, the belt is withdrawn from reel shaft 1 slowly, without exceeding a certain acceleration limit; in this case, inertial wheel 6 rotates at the same angular velocity as ratchet wheel 4 and synchronization disk 5. When, in the event of an accident, as a result of the forward lurching of the motor vehicle occupant, the belt is suddenly withdrawn at high acceleration, a difference in angular velocity is established between reel shaft 1 and inertial wheel 6, because inertial wheel 6 does not follow the high angular acceleration and therefore lags behind ratchet wheel 4 and synchronization disk 5 coupled thereto. In view of the fact that bevels 8 secured to inertial wheel 6 are complementary to the bevel-shaped recesses 9 on synchronization disk 5, said disk 5, because of the difference in rotational velocity between disk 5 and inertial wheel 6, must necessarily be released by disengagement of bevels 8 from bevel-shaped recesses 9. Synchronization disk 5 then takes up the position shown in FIG. 5. In this position, teeth 16 of synchronization disk 5 engage cam 14 of pivotable pawl 13 which swings around shaft 15 engaging the teeth placed externally on the circumferential surface of the ratchet wheel. Reel shaft 1 is now blocked preventing further withdrawal of the belt from the belt retractor, and the strapped-in occupant is retained in his seat by the locked and securely held belt.

Figure 6:
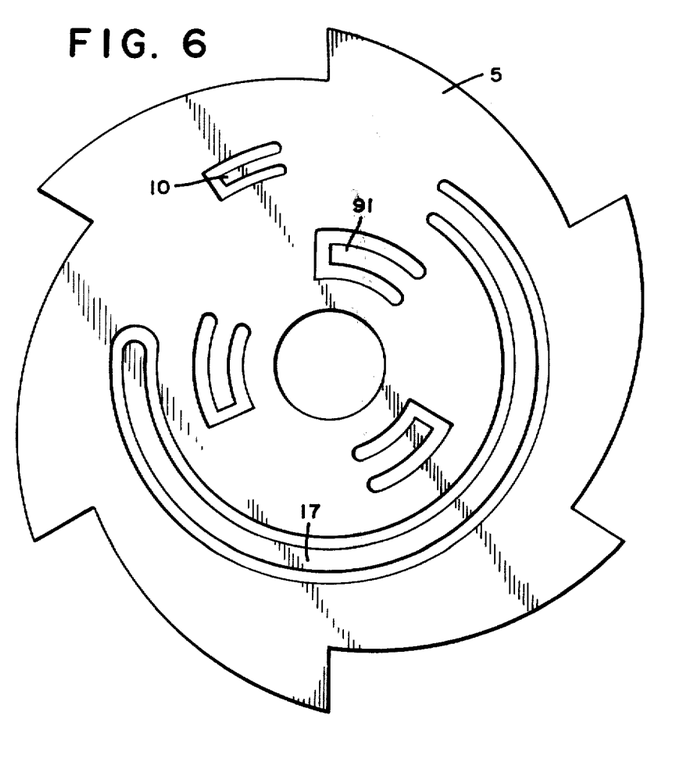
FIG. 6 is a side view of the synchronization disk from which the spring was punched out.
Figure 7:
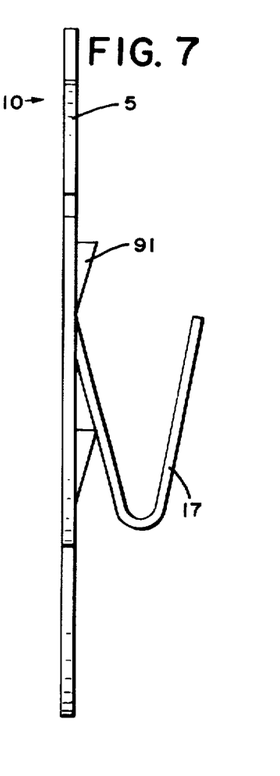
FIG. 7 is a side view in the direction of the plane of the synchronization disk showing the punched-out spring in bent condition.

FIG. 6 depicts a special synchronization disk of the type used in many embodiments of the invention. Said disk is provided with bevel-shaped recesses 91, punched out in an arch concentric with reel shaft 1, and a bent spring 17. As shown in FIG. 7, after being punched out, said spring is bent out of the plane of disk 5 after which it acts as a compression spring as described hereinabove. In place of pin 10 according to the embodiments of FIGS. 1-5, here a tongue (not shown in the drawing) may be punched out and then bent out of the plane of the disk. FIG. 7 shows tongues forming bevel-shaped recesses.

Figure 8:
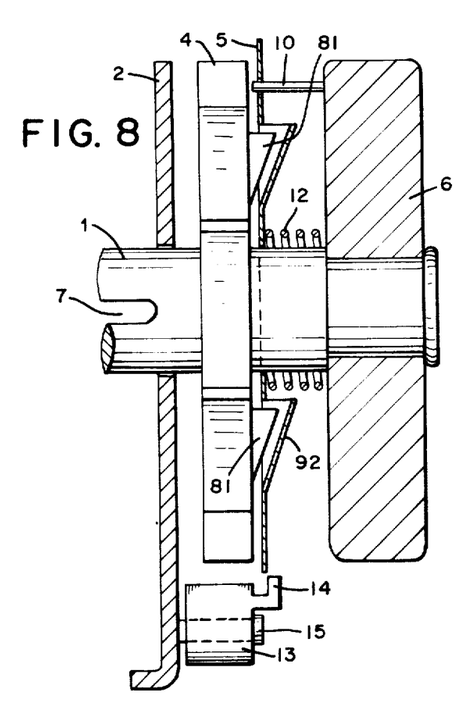
FIG. 8 represents another embodiment of the invention wherein the engagement bevels are fixed to the ratchet wheel, in normal, i.e., unlocked position.
Figure 9:
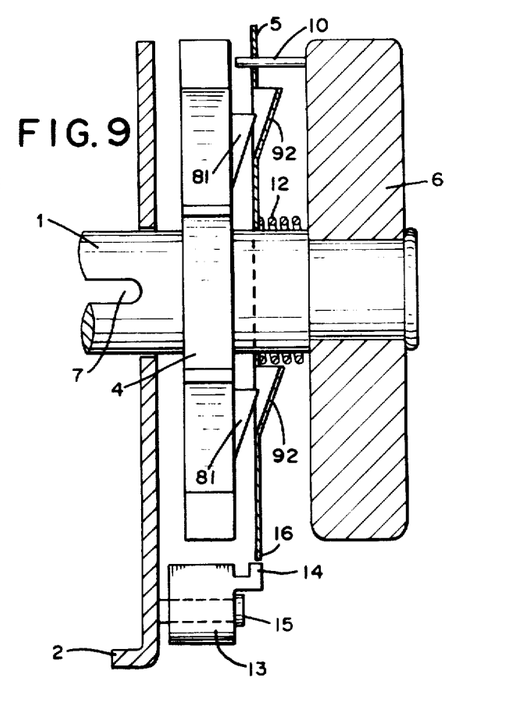
FIG. 9 is the same view as FIG. 8 but in the position shortly before locking, i.e., before the pawl whose cam has just engaged the teeth of the synchronization wheel, engages the teeth of the locking wheel.

FIGS. 8 and 9 show another embodiment of the locking device according to the invention wherein bevels 81 are secured to ratchet wheel 4 so that bevel shaped recesses 92 on synchronization disk 5, which is placed between ratchet wheel 4 and inertial wheel 6, protrude in the other direction namely toward inertial wheel 6. Here spring 12 is placed between synchronization disk 5 and inertial wheel 6 which are coupled by pin 10 in the aforedescribed manner. FIG. 9 shows the same embodiment but with teeth 16 of synchronization disk 5 in the position just before engaging cam hook 14 on pawl 13 which a little later swings up to engage the teeth of ratchet wheel 4, thus blocking reel shaft 1. When the belt is withdrawn at high acceleration, in the embodiment of the locking device depicted in FIGS. 8 and 9, in contrast to the first embodiment, the synchronization disk is displaced axially toward inertial wheel 6. For this reason, the cam in this case has the shape of hook 14. When the reel shaft is locked in an accident, slit 7 through which the end of the belt is inserted retains the belt in the known manner.

Figure 10A:
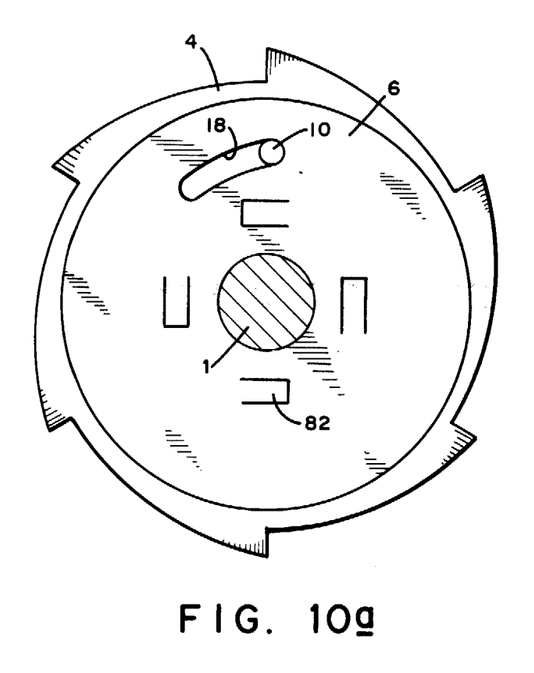
FIG. 10a is a section along line 10a—10a in FIG. 10b; it represents another embodiment of the locking device with a view of the inertial wheel and of the ratchet wheel behind it.
Figure 10B:
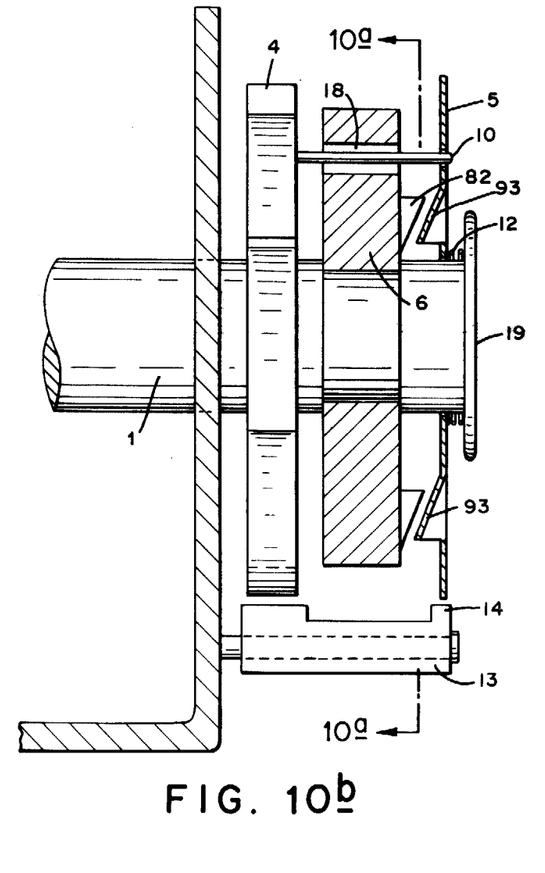
FIG. 10b is a side view similar to that of FIGS. 4, 5, 8 and 9 but referring to the embodiment of FIG. 10a in which the inertial wheel is placed between the ratchet wheel and the synchronization disk.

FIGS. 10a and 10b show still another embodiment. Here, too, bevels 82 are secured to inertial wheel 6, but synchronization disk 5 is disposed near the outer, free end of reel shaft 1, namely between disk 19, which is rigidly secured to the shaft and acts as bearing for spring 12 placed between disk 19 and synchronization disk 5, and inertial wheel 6. FIG. 10b shows the locking device in the locking position. Under normal use conditions of the embodiments of FIGS. 10a and 10b, the reel shaft turns at an angular velocity below a certain limit so that inertial wheel 6 which is provided with slot 18 turns at the same angular velocity. When the motor vehicle collides with an object, the strapped-in vehicle occupant lurches forward and in so doing causes the belt to withdraw from reel shaft 1 at high acceleration. Said shaft and with it ratchet wheel 4 and with it also synchronization disk 5, entrained by pin-shaped connecting member 10 which passes through arched slot 18 in inertial wheel 6 now turn at high velocity. Thus, as a result of the high angular velocity, reel shaft 1, ratchet wheel 4 and synchronization disk 5 rotate relative to inertial wheel 6 which bears bevels 8 and lags behind in rotary velocity. Even a slight relative motion between synchronization disk 5 and inertial wheel 6, as that permitted by arched slot 18, will cause sufficient disengagement of disk 5 from inertial wheel 6 by reason of the camming action of bevel 82 and bevel 93 into the position shown in FIG. 10b. External teeth 16 on the circumferential surface of synchronization disk 5 engage cam edge 14 on pawl 13, and in FIG. 10b are just about to urge the pawl to swing up enabling the heavy-duty pawl disposed on the other side opposite cam 14 to drop into a tooth space in ratchet wheel 4. This blocks reel shaft 1 and protects the occupant.

Figures 11, 12:
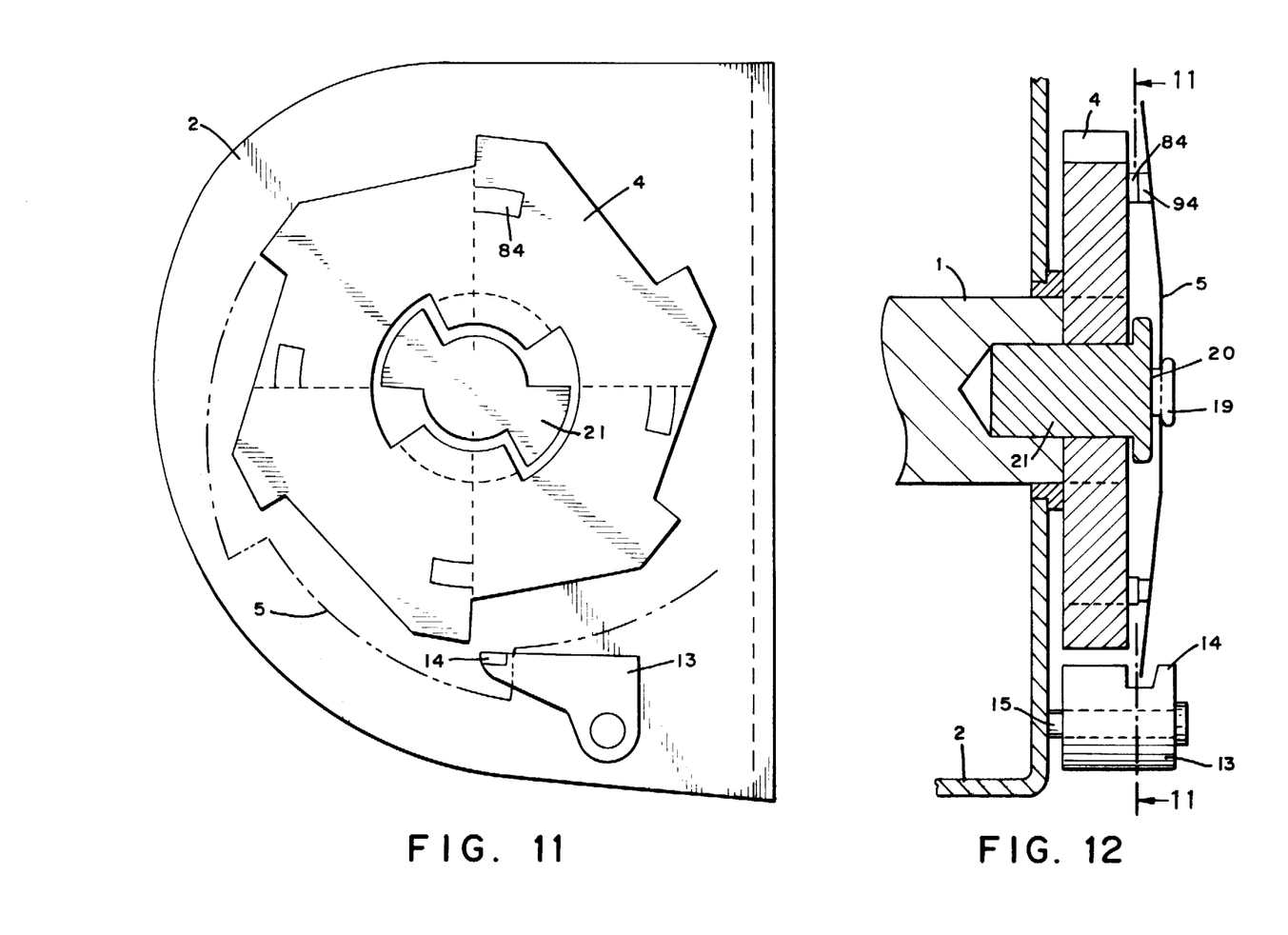
FIG. 11 is a sectional view along line 11—11 of FIG. 12, similar to the view shown in FIG. 2, of still another embodiment wherein the ratchet wheel at the same time performs the function of the inertial wheel and is disposed on the reel shaft so as to be axially undisplaceable and rotatable only to a limited extent.
FIG. 12 is a sectional view through the end of the reel shaft and the ratchet wheel.
Figure 13:
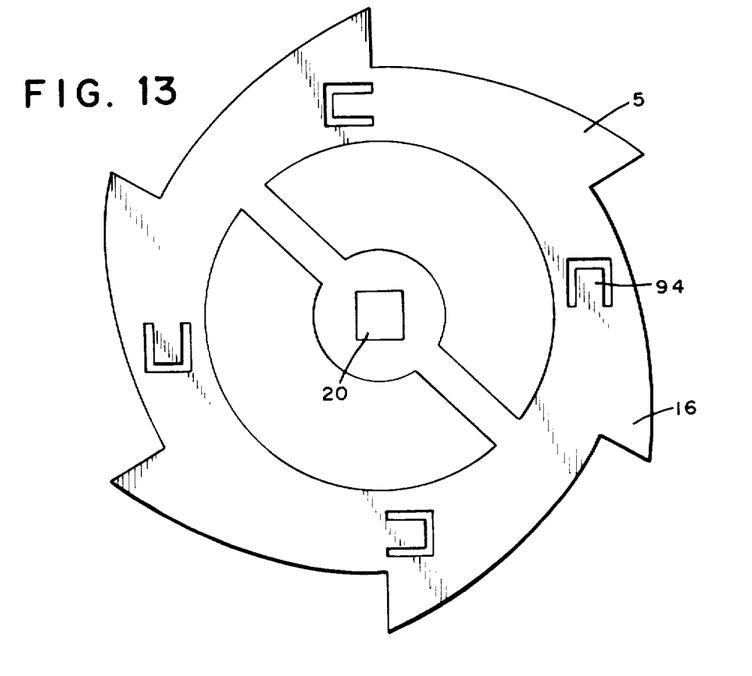
FIG. 13 is a top view, similar to that of FIG. 6, of the synchronization disk according to the embodiment of FIGS. 11 and 12, the synchronization disk here, however, being nonrotatably secured to the reel shaft, for example, by means of a square end.

FIGS. 11-13 show yet another, very simple embodiment of the lock-device of the invention. The inertial wheel as a separate element has been eliminated. It is no longer needed, because ratchet wheel 4 has taken over its function in surprisingly advantageous manner. It was previously mentioned in connection with arched slot 18 in FIG. 10a that even a short rotary motion is sufficient to accomplish disengagement. This principle is also at the base of the embodiment according to FIGS. 11-13. An inert 21 is centrally inserted or screwed into or otherwise secured to reel shaft 1, rotatably supported in housing 2, so as to form the free end of said shaft. The ratchet wheel which is only partly rotatable and axially undisplaceable is supported between the bearing in the side of the housing and a first large flange on insert 21 whereas the external free end of insert 21 bears on additional disk 19 which acts as thrust bearing for synchronization disk 5 placed behind a shoulder. In this embodiment, the external part of the bearing for synchronization disk 5 consists of square end 20. A spring is also not necessary, because the synchronization disk is fabricated from an elastic material. For this reason, synchronization disk 5 is slightly bent. In the peripheral area, synchronization disk 5 is provided with bevels 94 facing corresponding bevels 84 on ratchet wheel 4. Preferably, these bevels are similar to those in the aforedescribed embodiment. The bevels, however, can also act in radial direction. For example, if the synchronization disk is star-shaped star-shaped actuators move outward to engage the pawl. In the embodiment shown here, however, the actuators are teeth located on the circumferential surface of synchronization disk 5 and which engage cam part 14 on pawl 13.

When the synchronization disk is made of spring steel so as to be elastic, said disk also acts as return spring for ratchet wheel 4 in the direction of rotation so that, under normal conditions, the ratchet wheel is always kept in its starting position shown in FIG. 11. This offers an additional, very important advantage, namely that the teeth on ratchet wheel 4 can now safely be paddle-shaped, i.e., they may be cut at the base, because the pawl is always pushed out of the locking position by the cited spring action of synchronization disk 5. Many known belt retractors do not offer this advantage; rather, when the reel drum is full and the pawl has accidentally been brought into the locking position by vibration, the belt cannot always be withdrawn. In other words, the pawl lies behind the paddle-shaped tooth. The return spring force provided according to the invention in this case ensures that, in the normal position, the pawl can always move radially outward.

In use, the embodiment according to FIGS. 11-13 functions as follows: Under normal circumstances, when reel shaft 1 rotates at an angular velocity not exceeding a certain limit, the ratchet wheel depicted in FIG. 11 is in its rest position with cams 21' abutting against one side of the corresponding partly circular protrusion. When, in an accident, the belt is withdrawn from reel shaft 1 at high angular acceleration, said shaft rotates together with synchronization disk 5 rigidly connected thereto, the rotation over a small distance being faster than that of ratchet wheel 4; as a result, cams 21' can fall into their lateral position on the other side of the partly circular protrusion, said position being displaced by the rotation angle shown. In other words, within this limited amount of travel, ratchet wheel 4 rotates relative to reel shaft 1 with bevels 88 being displaced correspondingly toward bevel-shaped protrusions 94. As a result, synchronization disk 5 is pushed out of the bent position shown in FIG. 12 into the straight position as shown in dotted lines so that the teeth on the circumferential surface of synchronization disk 5 engage cam 14 of pawl 13. Locking then occurs in a manner similar to that in the aforedescribed embodiments.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. Locking device for a safety belt retractor, comprising:
   a. a reel shaft;
   b. ratchet wheel means provided with locking teeth and secured to said reel shaft;
   c. pawl means engageable with said locking teeth to lock said ratchet wheel means and the reel shaft against rotation;
   d. inertial means mounted on said reel shaft for rotation relative thereto upon a predetermined acceleration thereof;
   e. a synchronization disk having a very small mass inertial moment relative to the inertial means and being mounted on said reel shaft for axial movement on said reel shaft;
   f. said disk having projections on the periphery thereof to engage said pawl means;
   g. first disengagement means mounted on said disk;
   h. second disengagement means mounted on said reel shaft for rotational movement relative to said first disengagement means;
   i. said rotation of said inertial means relative to said shaft upon acceleration thereof causing the second disengagement means to rotate relative to said first disengagement means causing said disk to move axially into actuating engagement with said pawl means to move said pawl means into engagement with said locking teeth.

2. Locking device for a safety belt retractor, comprising:
   a. a reel shaft;
   b. ratchet wheel means provided with locking teeth and secured to said reel shaft;
   c. pawl means engageable with said locking teeth to lock said ratchet wheel means and the reel shaft against rotation;
   d. an inertial wheel mounted on said reel shaft for rotation relative thereto upon a predetermined acceleration thereof;
   e. a synchronization disk having a very small mass inertial moment relative to said inertial wheel and being mounted on said reel shaft for axial movement on said reel shaft;
   f. spring means mounted to bias said disk against axial movement;
   g. said disk having projections on the periphery thereof to engage said pawl means;
   h. first disengagement means mounted on said disk;
   i. second disengagement means mounted on said reel shaft in mating relationship to said first engagement means and for rotational movement relative to said first disengagement means;
   j. rotation of said inertial wheel relative to said shaft upon acceleration thereof causing the second disengagement means to rotate relative to the first disengagement means causing said disk to move axially into actuating engagement with said pawl means to move said pawl means into engagement with said locking teeth.

3. Device according to claim 2, wherein the first disengagement means is provided with bevel shaped recesses having contact surfaces that are concentrically disposed with respect to the reel shaft, and the second disengagement means is provided with mating beveled projections.

4. Device according to claim 3, wherein the mating beveled projections are secured to the inertial wheel, the spring means is located between the synchronization disk and the ratchet wheel, and a connecting member is located between and couples the ratchet wheel and the synchronization disk for simultaneous rotation while allowing axial movement.

5. Device according to claim 3, characterized by the fact: that the mating beveled projections are secured to the ratchet wheel, that said spring is provided between the inertial wheel and the synchronization disk, that said disk is located between said inertial wheel and the ratchet wheel, and that a connecting member is provided between and couples the inertial wheel and the synchronization disk for simultaneous rotation while allowing axial movement.

6. Device according to claim 3, characterized by the fact: that the second disengagement means are secured to the inertial wheel, that a spring is provided between the synchronization disk and an external disk rigidly connected to the shaft, that the inertial wheel is provided with a slot, that a connecting member couples the ratchet wheel and the synchronization disk for simultaneous rotation while allowing axial movement, and that said connecting member passes through said slot.

7. Device according to claim 2, characterized by the fact that the spring is fabricated in one piece with the synchronization disk.

8. Device of claim 3, wherein the ratchet wheel and the inertial wheel are the same member and wherein the ratchet wheel is mounted on said shaft for only limited rotational movement relative thereto.

* * * * *